United States Patent [19]
Crockett

[11] Patent Number: 5,279,527
[45] Date of Patent: Jan. 18, 1994

[54] SHIFTLESS, CONTINUOUSLY-ALIGNING TRANSMISSION

[76] Inventor: Samuel J. Crockett, 20456 Lake Lindsey Rd., Brooksville, Fla. 34601

[21] Appl. No.: 870,587

[22] Filed: Apr. 17, 1992

[51] Int. Cl.[5] .................. F16H 47/08; F16H 37/06
[52] U.S. Cl. ........................ 475/57; 475/43; 475/47; 475/51; 475/53; 475/55; 475/58; 475/121; 475/257; 475/283; 475/287; 475/291
[58] Field of Search .............. 475/35, 36, 43, 51, 475/55, 58, 59, 60, 61, 118, 121, 122, 123, 257, 283, 291, 292, 293, 318, 329, 330, 47, 57, 287; 192/48.92

[56] References Cited

U.S. PATENT DOCUMENTS

| | | | |
|---|---|---|---|
| 3,115,789 | 12/1963 | Chambers et al. | 475/57 X |
| 3,191,459 | 6/1965 | Welch | 475/51 |
| 3,293,945 | 12/1966 | Stockton | 475/59 |
| 3,302,488 | 2/1967 | Graff | 475/118 |
| 4,213,352 | 7/1980 | Crawford | 475/47 |
| 4,474,079 | 10/1984 | Crockett | 475/53 |
| 4,932,928 | 6/1990 | Crockett | 475/51 |
| 4,966,575 | 10/1990 | Lim et al. | 475/257 |

FOREIGN PATENT DOCUMENTS

| | | | |
|---|---|---|---|
| 865951 | 3/1971 | Canada | 475/57 |
| 3532450 | 3/1987 | Fed. Rep. of Germany | 475/57 |
| 3-288050 | 12/1991 | Japan | 475/35 |

*Primary Examiner*—Leslie A. Braun
*Assistant Examiner*—David E. Henn
*Attorney, Agent, or Firm*—Dowell & Dowell

[57] ABSTRACT

Improvements to a Shiftless, Continuously-Aligning Transmission (SCAT) to provide the turbine member of a torque converter with variable torque-increasing gearing and give it additional work advantage over a work load and eliminate a vast amount of slippage in the converter, the improvements embodying reactive planetary gears mechanically engaging the turbine to a sun gear of a planetary gear set; mobile ring gears controlled by a drive shell extending rearward and engaged to a mechanical ring gear modulator which controls the direction and speed of the planetary ring gears to vary the output torque being delivered by the converter; a two-section input turbine shaft; a clutch mechanism to engage the two turbine shaft sections; a clutchless, continuously engaged overdrive planetary unit; hydraulic controls; and electrical braking controls.

9 Claims, 7 Drawing Sheets

SHIFTLESS, CONTINUOUSLY-ALIGNING TRANSMISSION

BACKGROUND OF THE INVENTION

1. Field of the Invention

Since the introduction of the wheel and axle and the principle of the lever and fulcrum, engineers, designers, experimenters, inventors and others have tried to discover the secret of varying the output torque of an engine without changing gears and still be able to maintain an enmeshed gear train in the process.

The current invention covers improvements to a shiftless, continuously-variable transmission and is generally directed to power transmissions for automotive vehicles and also for heavy-duty equipment and off-highway vehicles which make use of torque converters, and more particularly, to those vehicles that shy away from automatic transmissions because of slippage in the torque converters.

This invention provides torque-increasing gearing that supplies a great work advantage for the turbine member of the torque converter, over and above that of the conventional converters, in its ability to develop high starting torque when needed and deliver it at variable output rates, which permits the turbine to operate at a much closer RPM to that of the impeller practically all the time to reduce slippage and help provide engine retardation in a drifting mode. The present transmission requires no sensors, modulators or governors to determine a shift in ratio, because it does not shift gears. It has no clutches except for engaging and disengaging the prime mover from the transmission gearing.

An overdrive planetary unit is included at the final drive and it is engaged at all times because the high torque ability of the turbine and gear train can provide sufficient torque in overdrive range to handle the work load, even at low speed and with excessive loading.

2. History of the Prior Art

There has been a lot of striving to create a truly variable ratio transmission that is efficient and possesses a broad ratio band and one that can stand up to high torque engines; but the only ones I have encountered are the CVT type with belts and variable pulleys and the hydrostatic type and both of these devices have great limitations. Some of the latest produced vehicles have a manual shift transmission endeavoring to get a better gas mileage efficiency. Some of the latest transmission designs to reach the market include computer technology to smooth out the shifts from one range to another; and some even account for wear of the clutch plates. I have found no record of patented transmissions using a fully enmeshed gear train that automatically varies the ratio by controlling the speed of the planetary ring gears to the optimum speed. Most are controlled by servo brake bands or clutches and operate like speed reducers and do not vary the output torque.

SUMMARY OF THE INVENTION

A continuously-variable gear type transmission, comprising first and second planetary gear sets operably interconnected to produce extremely high starting torque for the turbine of a torque converter when compounded and used for heavy-duty work. A single planetary gear set provides acceptable driving torque for passenger vehicles. The first planetary gear set has its sun gear engaged to the turbine drive shaft to provide driving force for the transmission. A second sun gear is engaged to the output planet carrier of the first gear set to drive the planet pinions of the second planetary gear set and provide much greater and variable starting torque when the two planetary gear sets are compounded and are operably interconnected.

Both the first and second planetary gear sets have mobile ring gears, and it is their tendency to freewheel CCW (counterclockwise) because of the reacting force created by the planet pinions operating against them. A drive shell engages the mobile ring gears and extends their reacting force rearward where the drive shell is mechanically engaged to a reaction-controlling modulator unit that is actuated by a shaft extension engaged to the ring gear support housing of the transmission unit to vary the speed of the first and second planetary ring gears and vary the output torque and speed of the transmission. The direction and speed of the ring gears is controlled by the reaction-controlling modulator unit being engaged to the mobile ring gear support housing of the transmission unit and the rotatable housing has its own rotation controlled by vehicle load, speed, and engine effort.

It is the primary object of this invention to provide a transmission that is small, of rugged construction and lightweight and that will be completely variable in operation and economical to manufacture and operate.

Another object is to provide efficient variable ratio torque delivery that will be economical for use with trucks or heavy duty equipment that abstain from using the automatic-type transmission because of their inefficiency caused by slippage within the torque converters.

Still another object is to provide torque-increasing gearing to assist the turbine member of a torque converter by increasing its work advantage and permit it to operate at a much closer RPM along with its respective impeller member and reduce slippage in the converter and provide a full ratio band in the gear train of the transmission.

A further object is to provide a transmission that has its gears more or less standardized with several of the gears interchangeable to reduce production cost and eliminate a maze of parts such as governors, servo units, modulators, kick-down devices and more.

It is also an object to provide a continuously-engaged overdrive gear set that does not have to be engaged or disengaged by clutches and be capable of providing overdrive output at all speeds.

A variable, continuously-enmeshed gear train transmission can be provided by employing the operating principle of the planetary gear set having a controlled mobile ring gear or by compounding the gear sets to provide extremely high starting torque for the turbine of a torque converter.

To provide the highest amount of torque delivery from a planetary gear set, the sun gear member is driven and the power delivery taken off the carrier. To get power delivery from the carrier member, the ring gear has to be controlled or the ring gear and planet pinions will spin off in a freewheel direction and dissipate the input rotation. The conventional automatic transmissions lock the ring gear down either by a clutch or a brake device to the transmission case to provide a react point for the planet pinions to drive against and move the planet carrier to deliver output torque. This method only provides gear reduction, because the output rotation of the carrier does not deliver variable torque while the ring gear remains stabilized.

In the present transmission, a planetary gear set provides fully variable output torque, but the ring gear member has not been locked down or immobilized. Instead, it is associated with another planetary unit that is a torque/speed modulator used t control the speed of the planetary transmission to give variable output power instead of locking the ring gear down and delivering a fixed ratio.

This device appears in the drawing, FIG. 1 of the existing U.S. Pat. No. 4,932,928. This variable transmission comprises two different types of input power (mechanical and hydro-kinetic) that are both delivered into the transmission simultaneously. The ring gear of the transmission gear set can only be controlled by the hydro-kinetic force of the turbine, because the turbine can slow down under heavy loading, but the mechanical input rotation cannot vary because of its toothed gear engagement. The mechanical power drives the input shaft and its associated sun gears.

The hydro-kinetic force controls the speed of the transmission ring gears, slowing them under heavy work load and permitting the mechanically driven sun gears to multiply torque by maintaining their speed or by driving the ring gears at a faster speed when the work load is lightened up to provide direct-drive ratio. In the existing U.S. Pat. No. 4,932,928, the turbine is engaged to the carrier of the torque/speed modulator unit and the turbine has an extremely limited power advantage because the ring gear is being driven at an overdrive delivery rate.

The present improvements to the existing U.S. Pat. No. 4,932,928, provide the turbine with an enormous work advantage over the work load which will be described in the specification and drawings.

Automatic transmissions are the favorite of the driving public, but the converters used in them are an improved version of the fluid coupling and permits a lot of slippage and dissipates much of the input engine torque. In order to provide increased torque for the turbine output drive shaft, engineers routed its torque delivery through planetary gear sets to reduce the speed and give the turbine more "wind-up" (torque multiplication). The planetary gear sets consist of a sun gear, a planet carrier with planet pinions and a ring gear. To get the most torque from a planetary gear set, the sun gear is driven, the ring gear is held by a clutch or brake band; and the output torque delivery is taken off the planet carrier member.

A work load on the output drive shaft resists the effort of the engine to move it or put it in motion; and when the engine drives the sun gear member that it engages, the planet pinions mounted on planet axles in the carrier use the teeth of the ring gear as a react point to drive the output carrier; and in doing so, they transfer the reacting force of the work load against the ring gear, causing it to spin off in a freewheeling direction. To prevent the ring gear from spinning away from the reaction forces, a clutch or brake band has been applied to the transmission case to hold it and provide the planet pinions a firm footing to drive against and move the planet carrier to perform work.

Holding the ring gear allows the turbine that is driving the sun gear of the planetary gear set to turn more times than the output member of the gear set it is driving than would otherwise be possible if the turbine was direct-connected to the carrier; and the increased amount of rotation afforded the sun gear provides torque multiplication for the turbine. However, this method of providing torque multiplication for the turbine, by immobilizing the ring gear, only delivers a fixed output ratio between the turbine and the planet carrier, which is not variable driving force.

To overcome this problem, the designers have added other planetary gear sets to the system to change the ratio up from Low to Intermediate, Direct-drive and Overdrive, etc., and various clutches shift from one speed reducer to another—automatically. This is why it is called an automatic transmission.

The automatic transmissions consist of several sets of clutches and planetary gear sets; and their ratio is limited by the number of planetary units involved and their high torque is fixed to a certain ratio.

The present transmission operates by modulating the reacting forces created between an input drive shaft, an output drive shaft and its work load and the speed of the vehicle. There are no hydraulic piston-type clutches involved and no clutch plates or sensing devices involved—it is instantaneous by reactive mobile fulcrum mechanisms.

Engines applied to work loads are usually as small as possible and they have to have means of "winding up" (torque multiplication). This allows the engine to rotate more times in relation to its output drive shaft when handling heavy work loads, providing the engine with an increased work advantage over the work. This is somewhat similar to slipping a clutch—it gives relief to the prime mover.

Torque converters also have to multiply torque inside the case by slippage between the turbine and the impeller. The greater the work load, the more lag or slippage is required between the turbine and the impeller. This type of slippage is much different from the gear type transmission, because it wastes more input energy. Kinetic force has to be transferred to the turbine through a high volume of oil; and pumping this oil takes extra energy and generates heat. Furthermore, the torque converters in the automatic transmissions drive the vehicle entirely with hydro-kinetic force rotating the turbine, and there is no mechanical connection between the engine and the output drive shaft.

Since the turbine of the converter has to slip or lag behind the impeller to multiply torque, the slippage should be taken out of the converter case and allowed to develop its torque mostly on the outside of the converter case through a torque-increasing planetary gear set having an automatically controlled ring gear to regulate the output torque and speed from the planetary gear set and give the turbine its optimum work advantage. In the present transmission, a mechanical transmission input drive shaft is engaged to the converter housing and delivers mechanical driving force at input engine speed while the turbine delivers hydro-kinetic force. This is what the improvements are all about—perfecting the torque converter's work performance and providing a shiftless gear train transmission that is efficient.

The present transmission is strictly a planetary-type transmission with only one clutch unit used to engage or disengage the power entering the transmission. It uses two planetary units compounded together for increasing the turbine output torque for extremely heavy work loads or a single planetary unit for light duty such as passenger vehicles as shown in FIG. 3.

The ratio of the present transmission is completely variable without any shifting and it has extremely high starting torque that is variable from its lowest range to direct-drive. A ratio of 1:1.333 between the input shaft and the overdrive planetary unit is established by using an equal diameter sun gear and planet pinions; and the overdrive unit remains engaged at all times and uses no clutch to shift it in and out of engagement at certain speeds. The torque-increasing gearing applied to the turbine provides sufficient torque to handle the overdrive unit at all times, even with constant engagement and at low speed. The reason an overdrive unit has been installed is because the transmission is only variable up to direct-drive where the input shaft and the primary shaft rotate at the same speed. When direct-drive range is attained, the overdrive planetary unit provides the additional ratio of 1:1.333 for highway cruising.

DESCRIPTION OF THE PREFERRED EMBODIMENT

Figure 1:
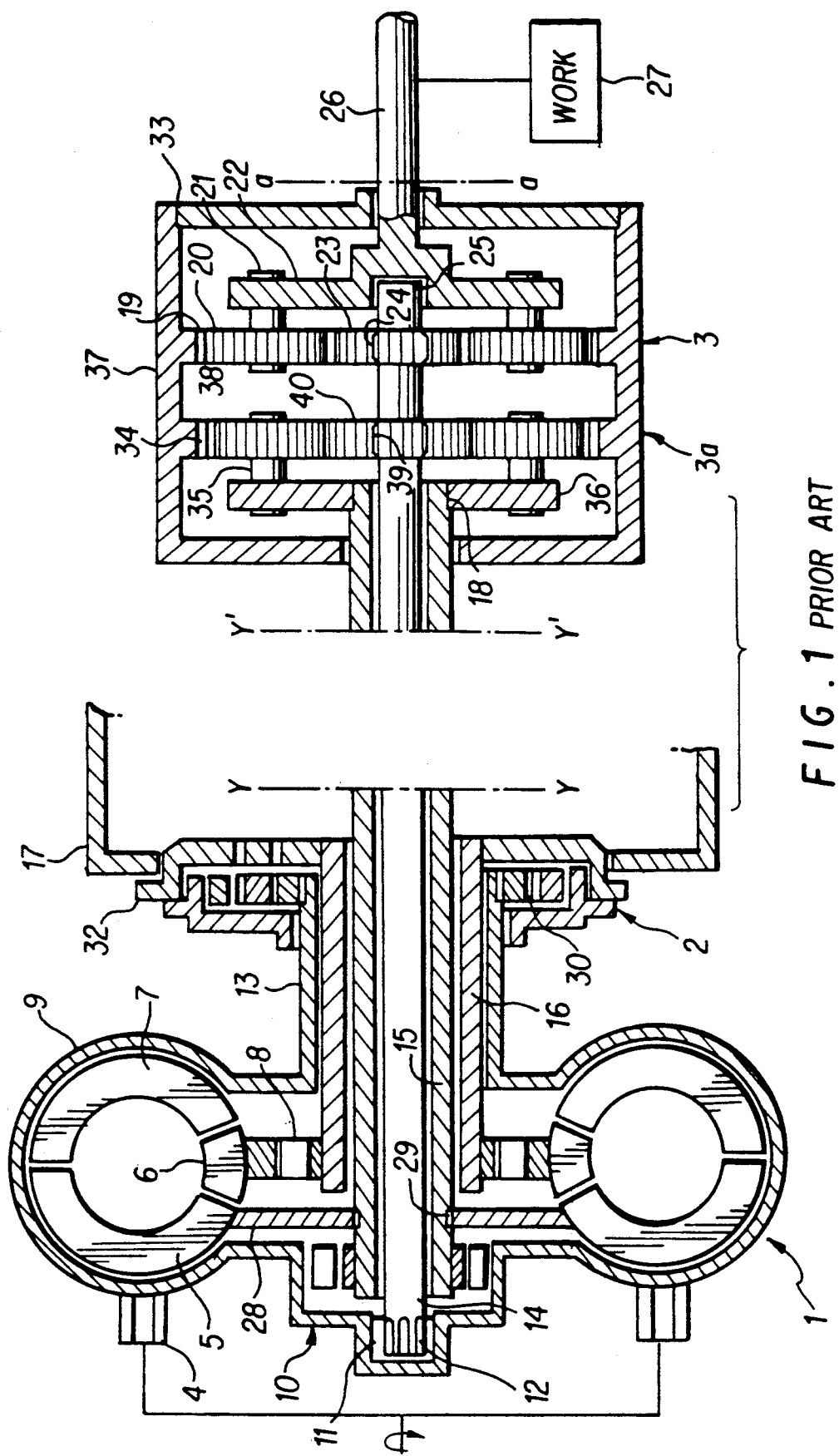
FIG. 1 is a diagrammatical cross-sectional view of the transmission shown in FIG. 1 of prior art U.S. Pat. No. 4,932,928 having components broken away along lines y—y and y'—y' and a—a and a'—a'.

With specific reference to FIG. 1, in the prior art transmission of U.S. Pat. No. 4,932,928, the application of hydro-kinetic force from the turbine 5 to drive the planet carrier 36 is the only way the transmission can be made to drive in a variable manner. As the reacting force of the work load varies up and down and as the change in speed and torque has to be modulated and directed back against the turbine 5 through the modulator unit 3a, the input rotation at low engine speed can be dissipated. However, the gear train that is driven by the converter housing 9 and shaft 14 is mechanically connected and moving at input engine speed and has no way of providing any relief for the prime mover.

To correct this work disadvantage that has been placed on the turbine 5 by engaging it to the carrier 36 a shown in FIG. 1, improvements are being applied to the existing device to provide a turbine with continuously-variable torque-increasing gear sets, consisting of the following units:

1. A two-section input turbine drive shaft;
2. A clutch to engage and disengage the two sections of the turbine input drive shaft;
3. A primary torque-increasing planet carrier unit;
4. A secondary torque-increasing planet carrier unit;
5. A drive shell in driving engagement with the ring gears of the primary and secondary torque-increasing planet carrier units;
6. A mechanical ring gear modulator to control the direction and speed of the ring gears and drive shell of the planetary units;
7. A clutchless overdrive planetary unit that delivers overdrive rotation at all the infinite power ratios;
8. A hydraulic system for controlling the engagement and disengagement of the turbine input torque; and
9. An electrical system to operate the slowing and braking operations.

The rotation referred to as CW (clockwise) and CCW (counter clockwise) is established looking from the input end of the transmission toward the output end. The one-way clutch designated by arrow 10 in FIG. 1 has been eliminated in FIG. 1a and FIG. 3.

In FIG. 1, the input rotation is applied to drive the converter housing 9 by lugs 4. A mechanical drive shaft 14 is splined to housing 9 by splines 11 and 12 and shaft 14 is driven at input speed. At the same time, the engine "E" is rotating the converter 1, the impeller vanes 7 transfer kinetic energy to turbine blades 5 that further drive turbine input shaft 15.

FIG. 1 is shown separated at lines y—y and y'—y'. The portion shown at the right side of lines y'—y' include a variable delivery transmission 3 and also a torque/speed modulator unit 3a. It should be noted that the turbine input drive shaft 15 is engaged to drive the planet carrier 36 by splines 18. This is being done by hydro kinetic force. The sun gear 40 and 23 are driven by mechanical input shaft 14 at input engine speed Engaging the turbine 5 to drive the planet carrier 36 forces ring gear 34 to be driven at an overdrive delivery rate continuously because axles 35 drags the planet pinions 38 against the mechanically driven sun gear 40 forcing ring gear 34 to be driven at a faster pace than the carrier 36 is moving and this places an extremely excessive work load on the turbine 5, causing a lot of slippage within converter 1 between the impeller 7 and the turbine 5 that dissipates much of the input torque. The carrier 36 drags planet pinions 38 around sun gear 40 by axles 35 and the pinions 38 further pull ring gear 34 and 19 CW in the direction the sun gears 40 and 23 are being driven. The transmission unit 3 and the torque/speed modulator unit 3a have to operate in this manner or the vehicle would be unable to stop with the engine still delivering rotation to the sun gears 40 and 23. When the output drive shaft 26 is stopped, it also stops carrier 22 and planet axles 21, but sun gear 23 keeps moving at input speed, driving the pinions 20 CCW on their axles 21. The torque/speed modulator unit 3a senses the torque and speed change and modulates the force against the turbine 5 to provide relief for the engine and directs the modulated force through shaft 15 against the turbine 5, permitting the vehicle to stand still and dissipate the input rotation at low engine speed.

The prime mover in the present invention is connected by mechanical means to the output drive shaft 26, FIG. 1, has its speed varied by the ring gear of the variable transmission unit, arrow 3, being speeded up or slowed down. The input shaft 14 drives sun gears 40 and 23 at input speed. The transmission 3 is driven by sun gear 23; and if ring gear 19 is driven at the same speed as the sun gear 23, the planet pinions 20 become caged between the ring gear 19 and the sun gear 23 and the drive shaft 26 is driven in direct-drive at the same speed of the sun gear 23. What makes the output on shaft 26 continuously variable is the ability of the ring gear 19 to slow down or speed up under various amounts of loading. The turbine 5 drives carrier 36 of the modulator 3a and the planet axles 35 drags the pinions 38 against the sun gear 40 in the same direction to force ring gear 34 CW and move ring gear 19 the same direction.

It is a prime objective of the present invention to provide a fully enmeshed gear train type transmission that is completely variable and one that does not have to shift gears like the automatic transmissions do. A single planetary gear set can provide this type of performance by driving the sun gear member and controlling the speed of the ring gear with relation to the speed of the sun gear involved in the gear set. As an example: The transmission, arrow 3, FIG. 1, delivers continuously-variable ratio to its planet carrier 22 and drive shaft 26. To create this variable driving force, a modified torque converter delivers both hydro-kinetic force and mechanical force at the same time. A mechanical input drive shaft 14 drives two sun gears, 40 and 23, that provide mechanical rotation to the transmission unit 3, while the turbine 5 provides hydro-kinetic force to the planet carrier 36, as shown in FIG. 1. By applying the hydro-kinetic force to the planet carrier 36 of the torque/speed modulator, 3a, it resulted in driving the ring gears 34 and 19 at an overdrive rate. This arrangement overloads the turbine, causing undue slippage in the torque converter.

To alleviate the burden that is being imposed on the turbine 5 under the above arrangement, means have been provided to give the turbine 5 sufficient variable increased torque while driving the ring gears 34 and 19 at an overdrive rate. The improvements shown in FIG. 1a comprise primary and secondary planetary gear sets 42 and 43 which provide variable torque-increasing ability to turbine 5 so it may have more turns in driving the work load than it would normally have if directly engaged to the carrier 36 as shown in FIG. 1.

Figure 1A:
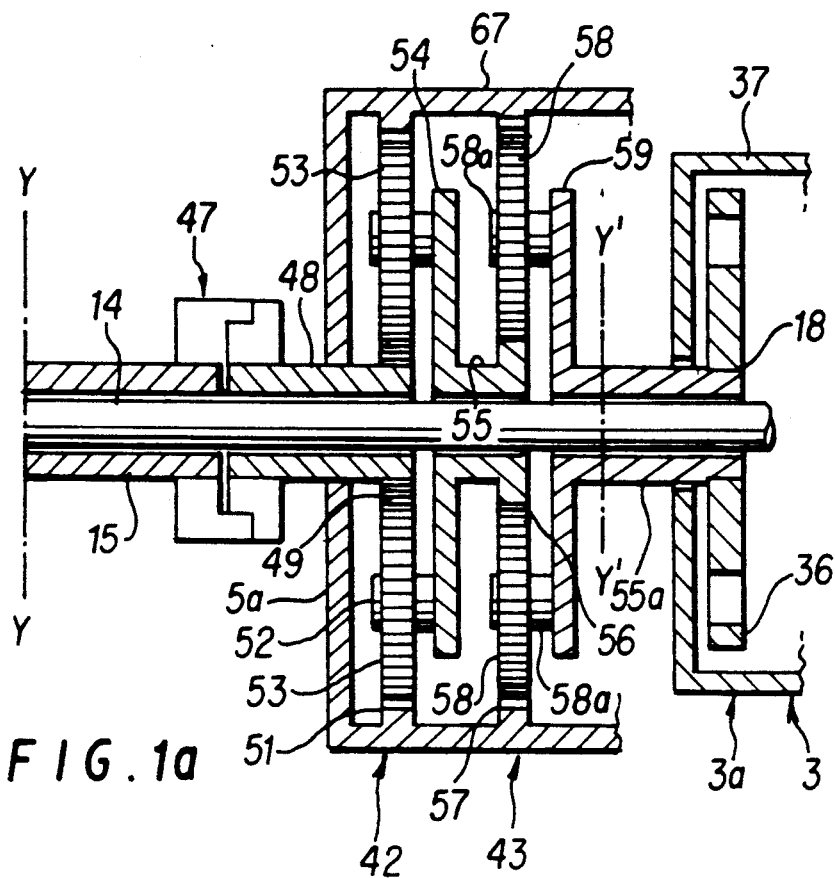
FIG. 1a is a cross-sectional view of the primary and secondary planetary gear sets and clutch of the present invention which are combined at y—y and y'—y' to the prior art transmission of FIG. 1.

In FIG. 1a, the turbine input shaft 15 has been separated into first and second sections connected through a clutch 47 and the second section has been numbered 48. When clutch 47 is engaged, it connects the torque from the turbine 5 to drive a sun gear 49 of unit 42. Unit 43 is shown compounded to unit 42 to provide additional torque multiplication.

The primary planetary gear set 42 includes a ring gear 51 formed along the inner surface of a drive shell 67 which meshes with planet pinions 53. The drive shell surrounds the rotatable ring gear support housing 37 containing the torque/speed modulator 3a and transmission 3. The pinions 53 orbit about a sun gear 49 which is fixed to a secondary turbine input shaft 48. The secondary input shaft 48 is connected to the primary input shaft 15 of FIG. 1 through a clutch assembly 47.

In the embodiment shown in FIG. 1a which is designed for use with vehicles having a heavy load demand, the planet pinions 53 are mounted to axles 52 of a planet carrier 54 and which carrier is connected to a secondary sun gear 56 of the secondary gear at 43 through a drive collar 55. The secondary gear set 43 further includes a ring gear 57 which meshes with planet pinions 58 which also mesh with sun gear 56. The ring gear 57 is carried by and formed with the drive shell 67. The planet pinions are mounted to a carrier 59 by axles 58a. In this manner, the secondary torque-increasing planetary gear set 43 extends its driving force through carrier 59 and coaxial drive collar 55a to engage and drive carrier 36 of the torque/speed modulator unit 3a, when both units 43 and 42 are compounded as shown in FIG. 1a. It should be noted that in the embodiment of FIG. 1a, the clutch 10 shown in FIG. 1 is no longer necessary.

It should be further noted that regardless of how much torque is multiplied by the combination of units 42 and 43, FIG. 1a, the torque being delivered is always routed through the mechanical gear train of the torque/speed modulator 3a and the variable transmission 3 before it is delivered to the output drive shaft.

The planetary-type torque-increasing gearing 42 and 43, has been deployed to engage the turbine 5 and the carrier 36 to give the turbine extremely high starting torque that is completely variable all the way up to direct-drive ratio. This arrangement does not remove the overdrive relationship between the ring gears 34 and 19 and the carrier 36 shown in FIG. 1, but it does provide the turbine with a remarkable work advantage over a work load on the output drive shaft.

The planet pinions 53 and 58a and sun gears 49 and 56 are of equal diameter. This alignment permits carrier 54 to multiply torque 4:1 and carrier 59 increases to 16:1 ratio. Increasing the work advantage of the turbine will not remove the overdrive speed relationship between the ring gear 34 and the carrier 36, but it will permit the turbine to maintain a real work advantage it did not possess.

The art involved in producing variable ratio delivery from a planetary gear set is accomplished by varying the speed of the ring gear member up or down while the transmission is being driven by the prime mover and accepting reacting force from a work load. Increasing the speed of the ring gears 51 and 57 moves the transmission closer toward direct-drive with more speed and less torque. Reducing the speed of the ring gears reduces the output speed and increases the torque. This is the technique used in the present invention to vary the ratio without shifting gears; and no clutches or brake bands are used to hold the ring gear members of the planetary gear sets. The ring gears are mobile and are operably interconnected and they are controlled by using the reacting force between the work load, the speed of the vehicle and the engine effort.

The control of the ring gears of the planetary gear sets in the conventional automatic transmissions differ here in that the automatic transmissions fully retard their ring gears to provide a leverage point on the ring gears for the planet pinions to drive against. In the present transmission, the ring gears also have to provide a leverage point for the planet pinions to drive against to perform work, but the leverage point is completely variable, which permits the planet pinions to start slowing down on their axles 52 and 58, FIG. 1a and axles 35 and 21, FIG. 1, as the speed of the vehicle and output drive shaft increases. At low vehicle speed, torque multiplication will develop within the transmission gear set 3 and 3a, FIG. 1, as well as in the planetary gear sets of the turbine units 42 and 43, FIG. 1a; and as the speed of the vehicle and output drive shaft increases, the ring gears 51 and 57, FIG. 1a, and ring gears 34 and 19, FIG. 1, will be forced to speed up, changing torque for speed; and when a direct-drive ratio is reached between shaft 14 and shaft 26, the internal rotation of the various pinions will stop and the output shaft will have an overdrive speed exceeding that of the input shaft 14. In direct-drive ratio, shaft 14 and 26 will always move at the same speed.

Figure 2:
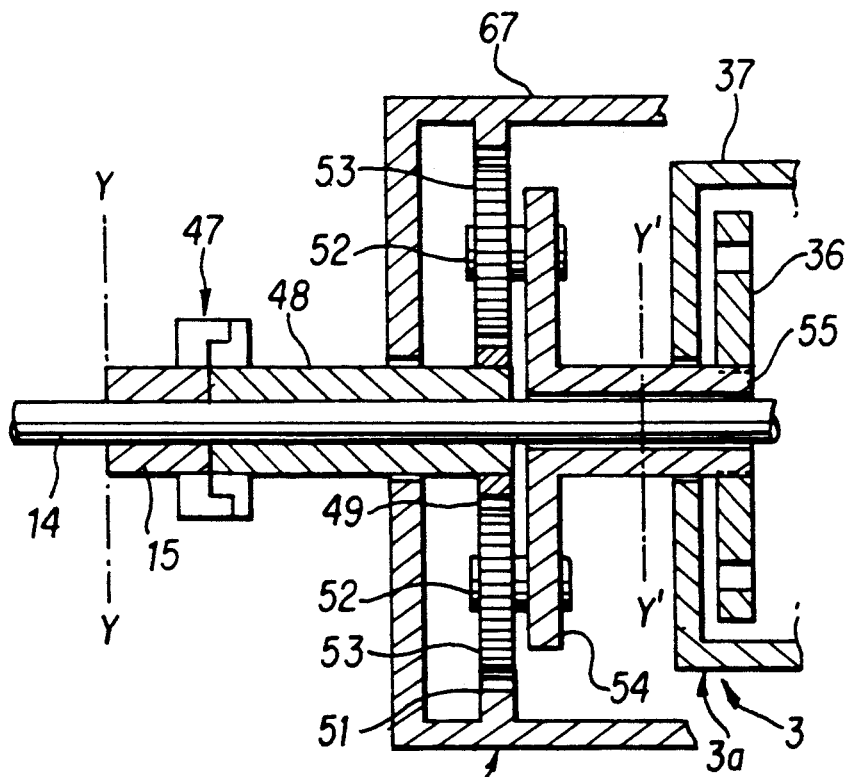
FIG. 2 is a cross-sectional view of a primary planetary gear set and clutch of the present invention which are combined at y—y and y'—y' to the prior art transmission of FIG. 1.

With specific reference to FIG. 2, in vehicles requiring relatively light load demand, such as automobiles, only a single torque-increasing planetary unit 42 is necessary. In this embodiment, the secondary input shaft 48 drives sun gear 49 which meshes with planet pinions 53 mounted to the axles 52 of carrier 54. The planet pinions mesh with the ring gear 51 carried by the drive shell 67. The carrier 54 is thereafter drivingly connected through collar 55 to the carrier 36 associated with the transmission unit 3 of FIG. 1.

Figure 2A:
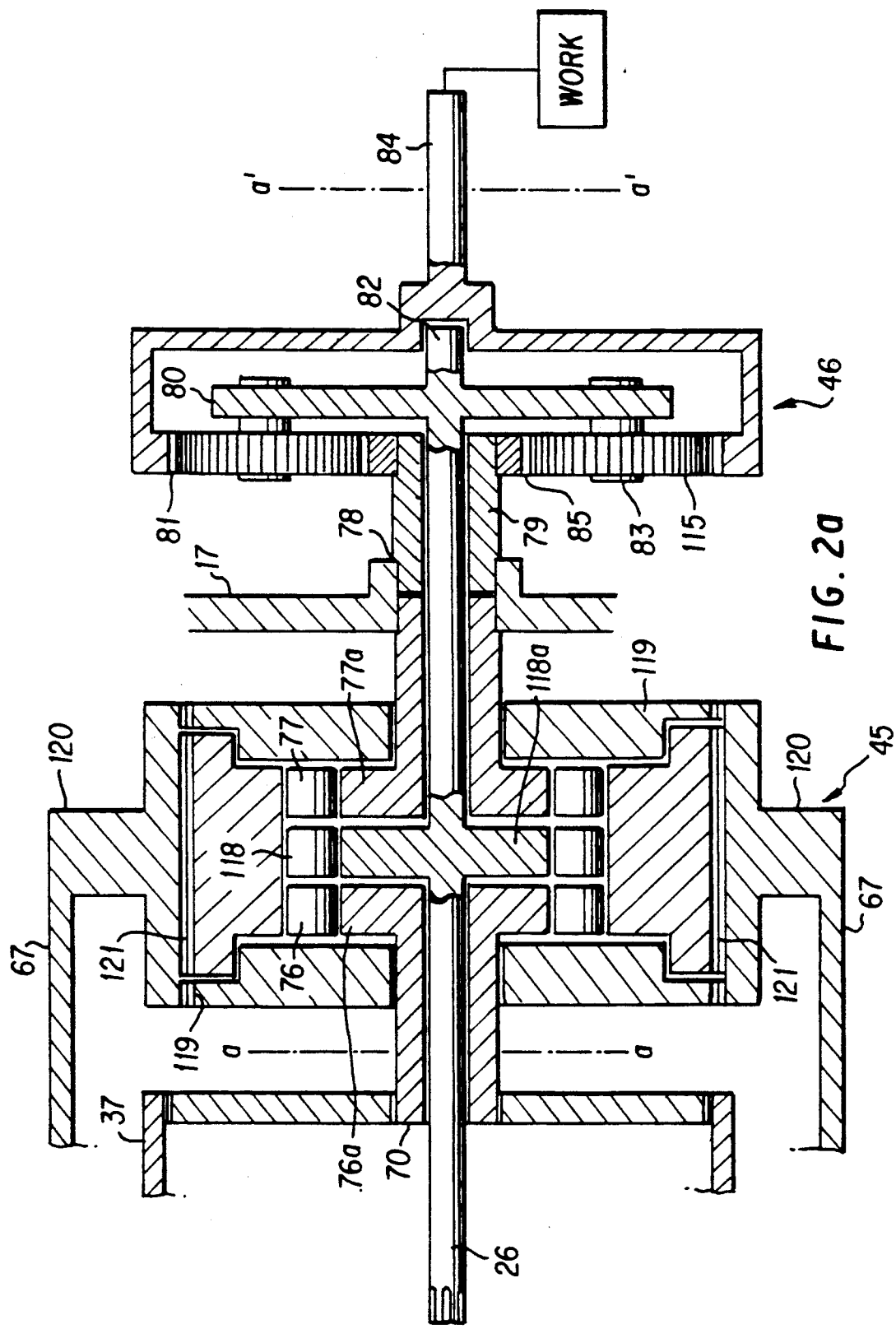
FIG. 2a is a cross-sectional view of a ring gear modulator and clutchless overdrive planetary gear set of the present invention which are combined at a—a and a'—a' to the prior art transmission of FIG. 1.

FIG. 2a shows a cross-section through a mechanical ring gear control modulator 45 which forms an end of the drive shell 67, showing three sets of one-way roller clutches. The ring gear control modulator is used with both of the embodiments of FIGS. 1a and 2. Roller 76 engages the outer clutch race 75 to the cam 76a of hollow concentric drive shaft 70 that is actuated by the movement of the ring gear support housing 37. The center one-way clutch roller 118 engages the outer clutch race 75 to the cam 118a on primary drive shaft 26; and the one-way clutch roller 77 engages the outer clutch race 75 to the main transmission case 17 by way of hollow concentric drive shaft 77a.

At initial start-up, the engine delivers mechanical torque against a work load and the work load delivers reacting force that tries to drive the ring gears 51 and 57 CCW, FIG. 1a, and this reacting force is delivered by drive shell 67 and flange 120 and splines 121 rearward of the transmission to apply CCW force against outer clutch race 75, and the clutch roller 77 locks clutch race 75 to case 17 to prevent CCW rotation, forcing torque delivery out on carrier 54 and drive collar 55 (of FIGS. 1a and 2) to perform work.

With outer clutch race 75 locked against CCW rotation, the planet pinions 53 shown in FIGS. 1a and 2 have an anchor to drive against and move carrier 54. This movement drives carrier 37, shaft 70 and cam 76a in a CW direction; and cam 76a and clutch roller 76 force the outer clutch race 75 in a CW direction and roller 77 releases its engagement to case 17, permitting the drive shell 67 and ring gear 51 to be driven CW and change up the ratio between the input shaft 14 and a modified output shaft 84. The CCW force continues to be applied against outer clutch race 75 while in a power mode, but the force is now being restrained by clutch roller 76 instead of clutch roller 77, once power starts moving housing 37 and shaft 70 CW.

In a drifting mode, the vehicle momentum will be supplying the driving force and use the engine compression to retard the vehicle speed. When a drifting mode sets in, primary output shaft 26 will want to move faster than the engine and input shaft 14. This action applies a CW freewheeling attitude to the drive shell 67. Any time outer clutch race 75 tries to move CW faster than shaft 26, clutch race 75 is locked to shaft 26 by cam 118a and clutch roller 118, causing the transmission to lock up in direct engine retardation and use compression to retard its speed. Support flanges 119 are provided as shown in FIG. 2a to keep the outer clutch race 75 both axially and radially aligned.

In FIG. 2a, clutch roller 77 is engaged between the outer clutch race 75 and a portion of the transmission case 17 by cam 77a, and the clutch roller 77 prevents the outer clutch race 75 from being rotated in a CCW direction. The one-way clutch roller 76 is engaged to an extension concentric drive collar 70 of the mobile ring gear support housing 37. When the vehicle is stopped, the output shafts 84 and 26 are both stopped, but the sun gear 23 is still moving at input speed and drives the housing 37 in a CCW direction while the vehicle is stopped, because the sun gear 23 continues to be driven mechanically at input speed by engine "E" and input shaft 14; and the one-way clutch roller 76 will release its engagement when ring gear support housing 37 and extension shaft 70 are moving CCW, allowing the outer clutch race 75 of the mechanical modulator unit 45 to be locked against CCW rotation by case 17 and one-way clutch roller 77 engaging the case 17 and holding in that direction. The outer clutch race 75 is held against CCW rotation while the carrier support housing 37 and concentric drive collar 70 are able to move CCW.

When a work load is encountered, reacting force created by the work load is directed against the ring gears 51 and 57, FIG. 1a, in a CCW direction. This CCW rotating force of the ring gears is directed rearward by drive shell means 67, which is engaged to the ring gears 51 and 57. At the rear end of the transmission, the force on drive shell 67 is engaged to a mechanical ring gear modulator, arrow 45, by supporting flange 120 and splines 121 that engage the outer clutch race 75 of the modulator 45. The modulator 45 has three over-run clutches, 76, 118, and 77 respectively. Clutch roller 77 locks the outer clutch race 75 and drive shell 67 to the transmission case 17, preventing the ring gears 51 and 57 from moving in a CCW direction. This holding action afforded drive shell 67 and ring gears 51 and 57 provides a stationary reaction point on the ring gears 51 and 57 for their associated planet pinions 53 and 58a to drive against to deliver rotating force to carriers 54 and 59. A coaxial shaft 55a extends the rotation to carrier 36 that starts forcing the ring gear support housing 37 to move CW, FIG. 1a. When ring gear support housing 37 moves CW, it drives extension shaft 70 and cams 76a also CW and cams 76a engage clutch roller 76 and the outer clutch race 75 and forces the drive shell 67 to move CW also by splines 121 and support flange 120. The CW rotation of drive shell 67 moves the ring gears 51 and 57 also CW to change up the ratio being delivered on the output drive shaft 84, because the speed of the sun gears 40 and 23 remain fairly unchanged since they move at input engine speed, while the increased motion of the ring gears 51 and 57 forces the planetary gear sets closer toward direct-drive ratio as their speed increases.

The holding force of clutch roller 77 is only momentarily at start-up. It engages the outer clutch race 75 and drive shell 67 to the case 17 to prevent CCW rotation of the drive shell 67 and this also stabilizes the ring gears 51 and 57 so their planet pinions can drive against them and deliver output torque to their planet carriers 54 and 59. This output rotation drives carrier 36, ring gear support housing 37, extension collar 70 and the cams 76a; and the CW rotation of cams 76a engages the outer modulator clutch race 75 and starts driving it CW, pulling it free of the case 17 and clutch roller 77. The CCW reacting force of the work load is still being applied against the drive shell 67 but it is no being controlled and applies force CCW against clutch roller 76 instead of clutch roller 77. Clutch roller 77 has its cams aligned to release engagement when the outer clutch race 75 is moving CW. As the speed of the vehicle increases, the ring gears 51 and 57 will increase also until they reach the saturation point of direct-drive ratio between the ring gears and their sun gears 49 and 56.

Figure 3:
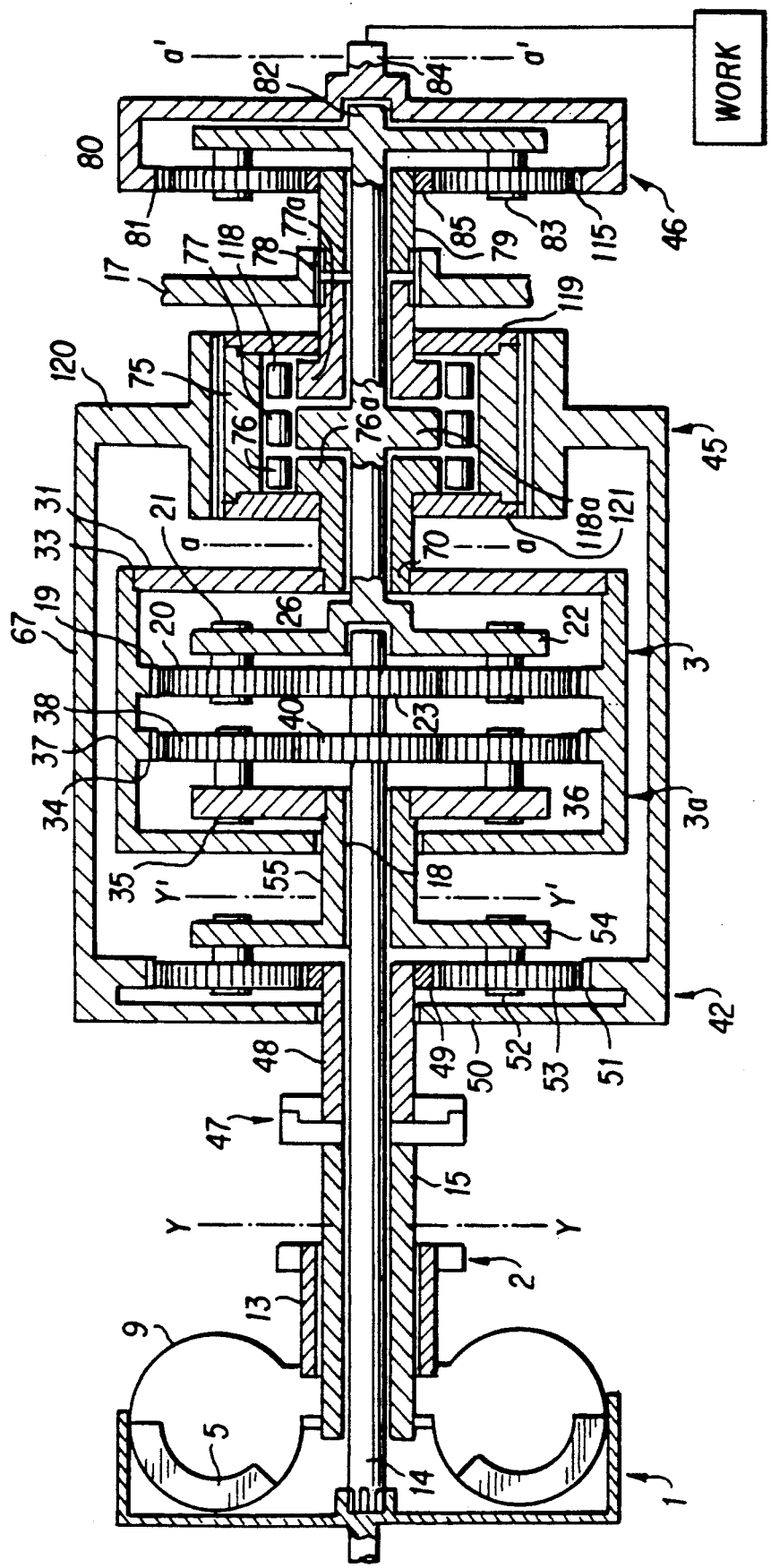
FIG. 3 is a cross-sectional view of the elements of FIGS. 2 and 2a in combination with the transmission of FIG. 1.

The planetary gear set 46, shown in FIG. 2a and also in FIG. 3 is an overdrive gear set. An overdrive gear set is necessary because the input shaft 14 and primary output shaft 26 can only attain a direct-drive ratio by reactive force and the overdrive permits the prime mover to run less at highway cruising speed. The overdrive unit 46 has a sun gear 85 engaged to a coaxial collar 79 that is splined to case 17 by splines 78 to prevent the sun gear 85 from moving in either direction. A primary output drive shaft 26 is engaged to and drives planet carrier 80 that is fitted with plane pinion axles 83 and has planet pinions 115 mounted thereon and the pinions 115 are driven against the stationary sun gear 85 and delivers rotation to ring gear 81 to drive the final output drive shaft 84 to perform work in an overdrive range. A shaft extension 82 of the carrier 80 provides support for the rotatable ring gear 81 and output shaft 84. By maintaining the diameters of the sun gear 85 and the planet pinions 115 equal, an output ratio of 1:1.333 is established between the primary drive shaft 26 and the final output drive shaft 84.

FIG. 3 shows a cross-section through the entire transmission employing a single torque-increasing planetary unit, 42, as would be suitable for passenger vehicles and shows the rotatable ring gear support housing 37 and the transmission unit 3 and the torque/speed modulator unit 3a that are detailed in FIG. 1 as being engaged to and driven by carrier 36 that is further engaged to and driven by carrier 54 of unit 42. Also shown in FIG. 3 is the positioning of the mechanical ring gear modulator 45, and the overdrive unit 46. It should be noted in FIG. 1a, FIG. 2 and FIG. 3 that the rotatable ring gear support housing shown as 37 in FIG. 1 has had a concentric shaft extension 70 engaged to it and it extends into the mechanical ring gear modulator unit 45 where it engages one-way clutch roller 76 to drive the outer clutch race 75 of the mechanical ring gear modulator 45 in a CW direction when the mobile ring gear support housing 37 is being driven.

The mechanical ring gear modulator, arrow 45, and the overdrive planetary unit, arrow 46, are located along the length of the drive shaft 26 and are shown at a—a in FIGS. 1, 2a and 3, and the modulator unit arrow 45 gets its driving force from the mobile ring gear support housing 37 by means of shaft extension 70 and the overdrive unit receives its driving force from primary output drive shaft 26 which drives planet carrier 80 and delivers overdrive ratio to output drive shaft 84 to perform work.

RING GEAR CONTROL

In FIG. 1a, primary planetary gear set 42 is the variable torque-increasing gearing applied to the turbine 5. The ring gear 51 of the primary gear set 42 is engaged by a drive shell 67 that surrounds the rotatable ring gear support housing 37 that contains the transmission unit 3 and the torque/speed modulator unit 3a as shown in FIG. 3. The drive shell 67 is extended rearward to engage the outer clutch race 75 of the mechanical ring gear modulator unit, arrow 45, by support flange 120 and splines 121.

In FIG. 3, the sun gear 49 is driven by hydro-kinetic force by turbine 5 of the converter 1. The rotation of sun gear 49 against planet pinions 53 on their axles 52 uses the teeth of ring gear 51 as a react point to walk around inside the ring gear and drive axles 52 and the associated planet carrier 54 to deliver torque to planet carrier 36. The output torque from carrier 54 is directed against a work load on output shaft 84. The work load 27 resists the effort to move it or place it in motion and a reacting force is directed back through the various gearing to the ring gear 51, giving it a tendency to move in a freewheeling direction CCW, but it is unable to rotate CCW because of the one-way clutch roller 77 in the mechanical ring gear modulator 45 preventing the outer clutch race 75 from moving in a CCW direction because the clutch roller 77 engages the outer clutch race 75 to the fixed transmission case 17. Since outer clutch race 75 is being retarded by clutch roller 77 from moving CCW, it also prevents the drive shell 67 and ring gear 51 from moving backward or CCW because the drive shell 67 is splined to outer clutch race 75 by splines 121, forcing ring gear 51 to a complete stop and permits the planet pinions 53 to have a firm engagement point to drive against on ring gear 51 to move the output carrier 54 and deliver rotating force to do work. When drive shell 67 holds ring gear 51 stationary by this clutch action of the mechanical modulator 45, the planet carrier unit 42 is capable of delivering its highest torque multiplication; and if the ring gear 51 is advanced CW by the drive shell 67, the torque decreases and the output speed increases.

Any amount of rotation of the output carrier 54 will deliver driving force to carrier 36 and force the mobile ring gear support housing 37 to move CW and deliver output torque to the output shaft 84, regardless of how slow it may be. The rotation of support housing 37 drives the coaxial drive collar 70 CW, engaging clutch roller 76 to drive the outer clutch race 75 CW, thereby releasing the engagement of roller 77 that was holding the outer clutch race 75 against CCW rotation by locking it to housing 17. Outer clutch race 75 being driven CW by the collar 70 changes the speed of drive shell 67 and the ring gears 51 and 57 and increases the speed of output shaft 84.

Figure 4:
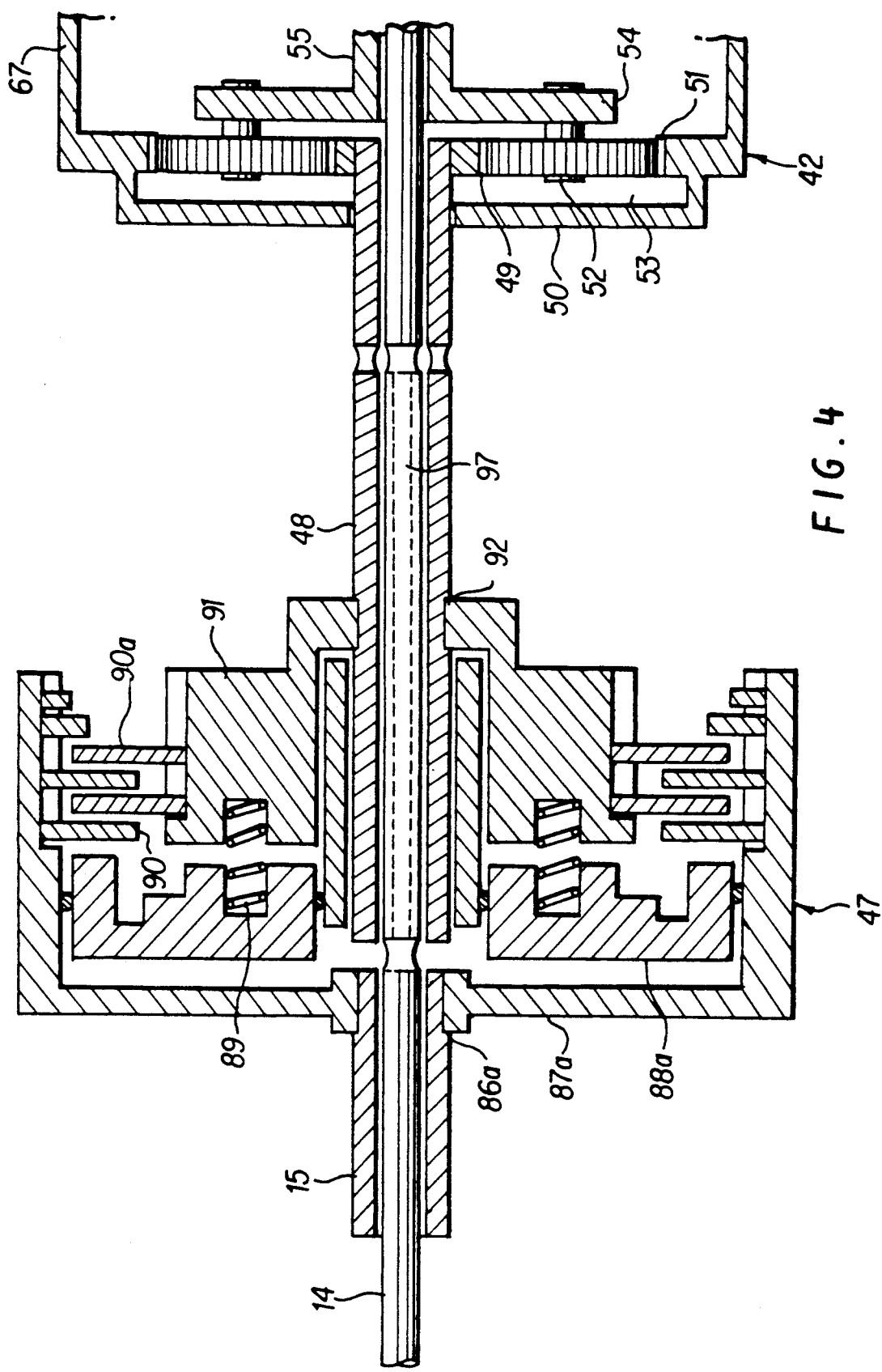
FIG. 4 is a cross-sectional view of the clutch 47 shown in FIGS. 1a, 2 and 3.

In FIG. 1a, FIG. 2 and FIG. 3, and as specifically shown in FIG. 4, a support flange 50 is journaled around the second section of turbine input shaft 48 that is driven by clutch hub 91 and splines 92 to support ring gears 51 and 57 and one end of drive shell 67. The clutch drum 87a is engaged to the primary turbine input shaft 15 by splines 86a.

With reference to FIGS. 1a-3, if a load slows output shaft 26 down, the planet pinions 20 supplies relief to the sun gear 23 by driving the ring gear 19 slower, and the modulator 3a directs the change in speed and torque against the turbine 5, because sun gear 40 is moving at the same speed as gear 23. So the movement of the ring gear support housing 37 regulates the torque applied to shaft 26. The movement of the ring gear support housing 37 also regulates the speed of the mechanical ring gear modulator, arrow 45, in the same manner, because an extension drive collar 70, FIG. 2a, has been engaged to the ring gear support housing 37, and it moves the outer clutch race 75 by engaging the one-way clutch roller 76 to drive the outer clutch race 75 in a CW direction. The outer clutch race 75 is splined to the drive shell support flange 120 by splines 121 to engage the drive shell 67 and ring gear 51 and also engages ring gear 57 when unit 43 is compounded to unit 42, as shown in FIG. 1a.

Therefore, the CW rotation of the ring gear support housing 37 not only regulates the speed of the ring gears 19 and 34 of the existing patent, but it also regulates the speed of the ring gears 51 and 57, FIG. 1a, of the improvements shown by arrows 42 and 43.

At initial start-up, clutch roller 77 prevents any CCW rotation of the outer clutch race 75, which action forces the ring gears 51 and 57 to be momentarily immobilized. This action provides a react point on the ring gears 51 and 57 for sun gears 49 and 56 to drive their planet pinions against and move the carriers 54 and 59. This holding action of the ring gears 51 and 57 provides driving force to be delivered to the ring gear support housing 37 in a CW direction, forcing clutch roller 76 to drag the outer clutch race 75 free of the clutch roller 77 and case 17 and applies the reacting force against clutch roller 76 instead of clutch roller 77 as it did when it first started to operate.

The foregoing explanation describes how the reaction force on ring gear 51 is overcome by the clutch roller 77 engaged to the case 17 and holding the drive shell 67 and ring gears 51 and 56 stationary to provide maximum torque multiplication by allowing the planet pinions 53 and 58a to walk around the inside of the stationary ring gears 51 and 57, using the ring gears for a react point to drive the carriers 54 and 59.

When the sun gear 49 is driving against a work load, a reacting force is created and is continually pushing CCW against the ring gears 51 and 57 and clutch roller 77 by drive shell 67 and splines 121 and drive flange 120 and as long as a work load is being engaged, this pushing or CCW force continues to be applied to the ring gears and the drive shell 67; but the holding and regulation of the ring gear 51 causes rotation to be delivered to the carrier 54 because the ring gear 51, being held stationary by clutch roller 77, provides a leverage point for the pinions 53 to drive against.

The movement CW of carrier 54 forces ring gear support housing 37 to move CW also and as it moves CW, it drives the concentric drive collar 70, FIG. 2a, and FIG. 3, and the collar 70 engaged to clutch roller 76, FIG. 2a starts moving the outer clutch race 75 CW also and the CW motion of outer clutch race 75 starts dragging the drive shell 67 CW also by splines 121 and support flange 120, FIG. 2a. The CCW reacting force of ring gear 51 is still here and applied against the outer clutch race 75, but the driving torque being delivered from sun gear 49 is now holding the outer clutch race 75 from moving CCW by action of clutch roller 76 instead of action by clutch roller 77 that was holding against the case 17 to begin with.

When the sun gear 49 starts driving and rotation is developed on carrier 54, FIG. 3, clutch roller 77 releases its engagement to the outer clutch race 75 and the carrier 54 drives concentric shaft 55 and carrier 36 to force planet pinions 38 against the moving sun gear 40, FIG. 3, and together, the sun gear 40 and planet pinions 38 drag ring gears 34 and 19 CW; and since ring gear 19 moves CW also and sun gear 23 is moving CW by mechanical input shaft 14, the planet axles 21 forces carrier 22 to deliver rotation to primary output drive shaft 26 and produces mechanical driving force on main output drive shaft 84. As the speed of the vehicle increases, it changes the speed of the planet pinion axles 21 and planet pinions 20 because the carrier 22 is engaged to the output drive shaft that varies with vehicle speed.

This is how the ratio of the transmission is changed up from its maximum torque while ring gear 51 is held stationary by drive shell 67 and the outer clutch race 75 of the mechanical ring gear modulator 45. As the vehicle begins increasing speed, the planet carriers 22, 36, 59 and 54 start approaching the speed of their associated sun gears 23, 40, 56 and 49 respectively; and when they all attain the same speed, the transmission is in direct-drive and the pinions stop rotating on their axles and move around the center axis of the transmission with the sun gears. However, the reacting force from the work load is still pushing CCW against the outer clutch race 75, but the outer clutch race 75 is still being pulled CW by the drive collar 70 and the one-way clutch roller 76; and the one-way clutch roller 77 that prevents CCW rotation of outer clutch race 75 releases its engagement to the case 17 because of the arrangement of the cams in the output side of the mechanical modulator unit 45.

Figure 5:
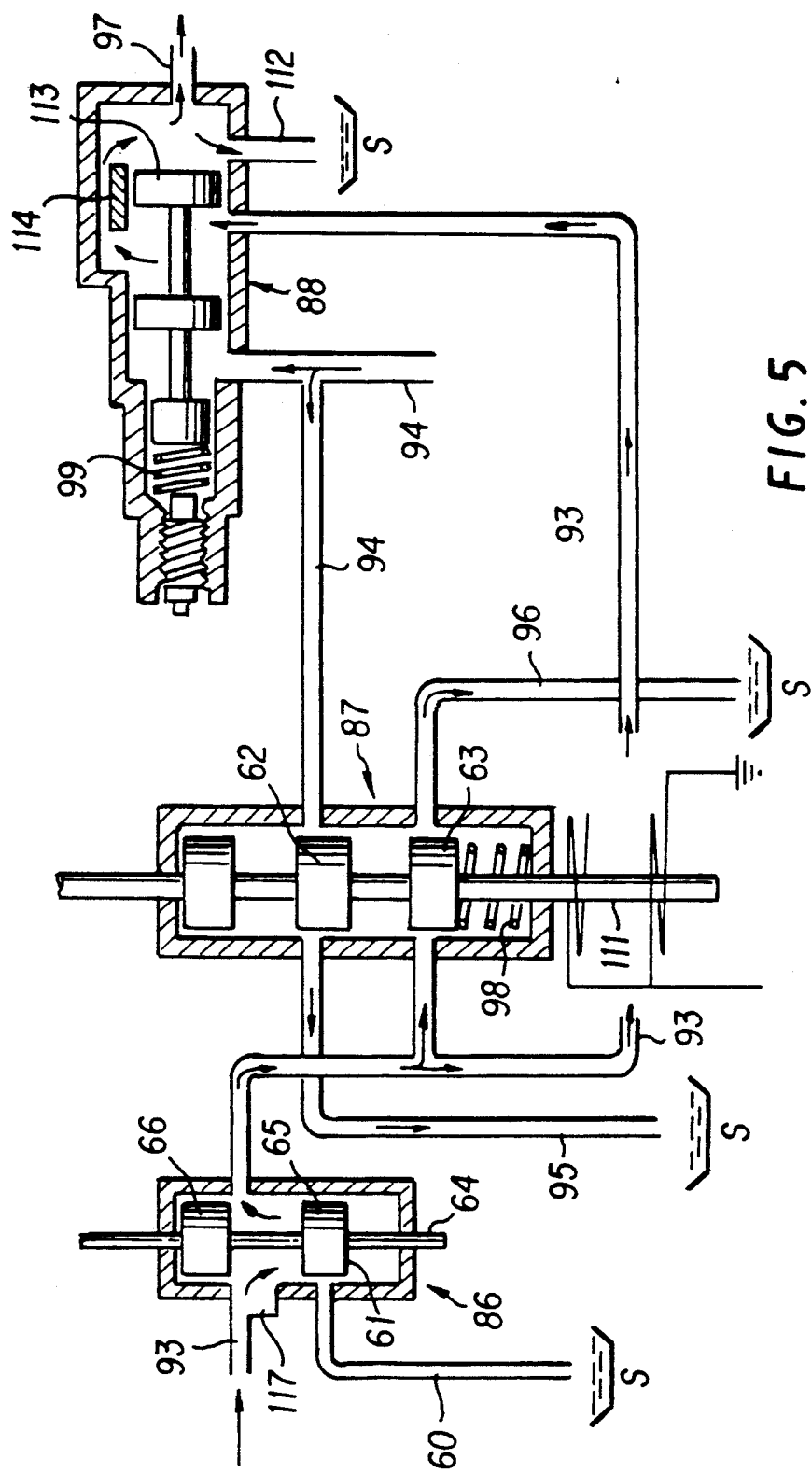
FIG. 5 is a schematic view of a hydraulic control circuit used with the transmission of the present invention.

FIG. 5 is a diagram of the hydraulic lines that connect the manual control valve, arrow 86, the braking relief valve, arrow 87 and the clutch control valve, arrow 88. Arrow 86 indicates a section through the manual control valve and it is shown in a pressure mode supplying pressure to the clutch control valve, arrow 88. The brake control valve indicated by arrow 87 is also shown in the electrical diagram in FIG. 6; and it is actually actuated by the electrical circuit and the solenoid coils 107 and 108 when the circuit 105 is energized by action of the hydraulic pressure in line 100 closing the contacts in the brake switch 104 when the brake is applied by the operator. (The brake is not shown.)

Figure 6:
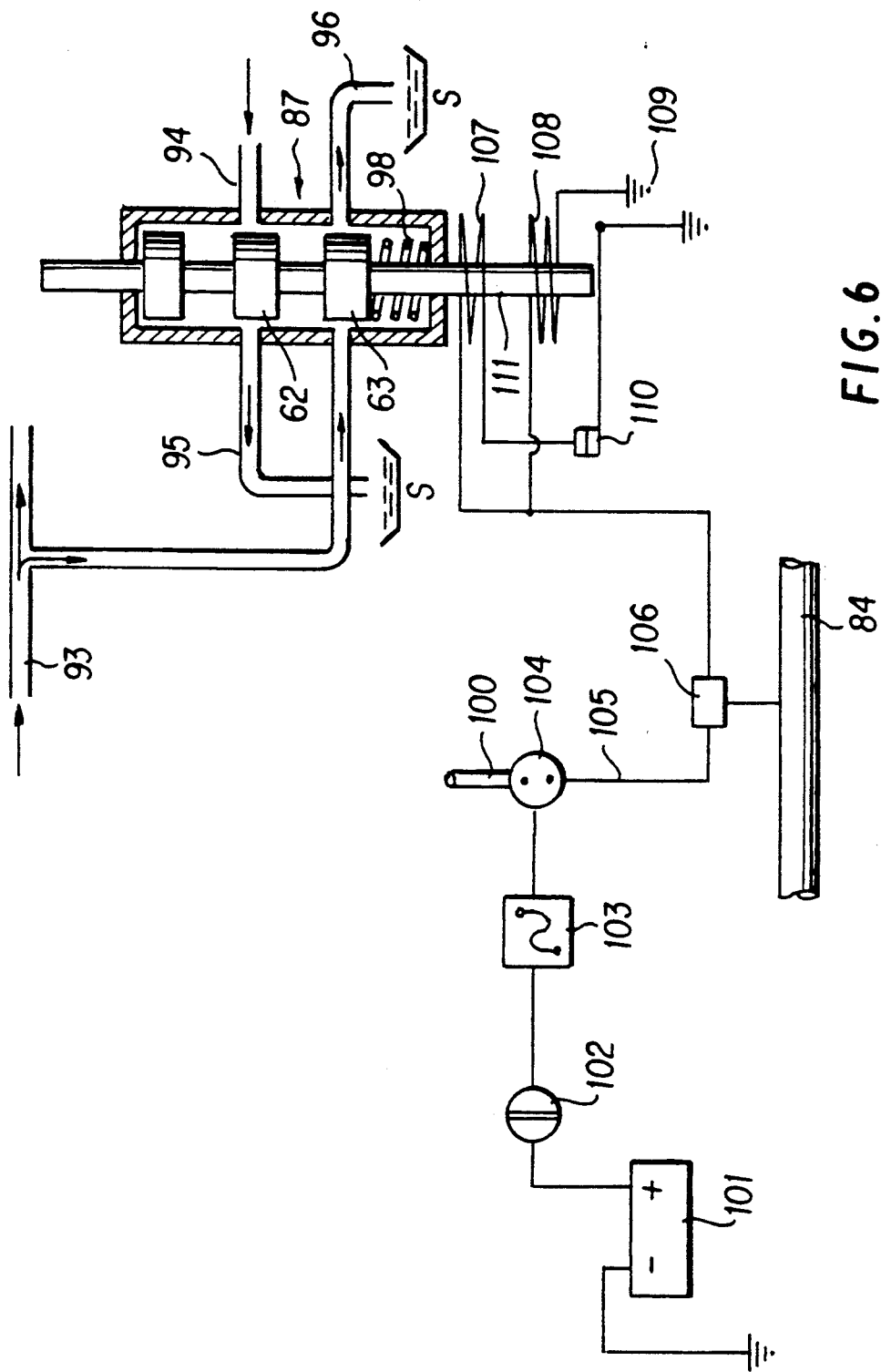
FIG. 6 is an electrical diagram used in conjunction with a braking system of a vehicle using the transmissions of the present invention.

FIG. 6 is a diagram of the electrical circuitry used in conjunction with the hydraulic brake (not shown) when slowing or stopping the vehicle for any reason. The brake relief valve, arrow 87, detailed in FIG. 5 and FIG. 6, is included in the electrical diagram. The relief valve 87 is shown in driving position, FIG. 5, with the input port 94 and discharge port 96 blocked by the valve pistons 62 and 63, closing off lines 94, 95 and 96. This is the normal driving position of the brake valve 87 and it is also shown in FIG. 6. It is desirable at times to use the brakes to slow the vehicle without coming to a complete stop. When traveling down grade and slowing down for a turn or some other reason, the operator will not want the engine to be disengaged from the transmission and lose the retardation benefit of the engine compression; and that is why the speed sensor shown as 106 is installed in the electrical circuit 105 so the clutch 47 will not be disengaged except at extremely low speed.

The sensor 106, FIG. 6, is calibrated to close only at low drive shaft speed of shaft 84, and preferably around 3 miles per hour or less; and this will permit the brake to be used to slow the vehicle without disengaging the clutch 47, FIG. 4, and lose the engine retardation. If a stop light is approached and the vehicle must be completely stopped, holding the brake will apply pressure in brake line 100 to close the brake switch contacts in switch 104, directing current as far as the sensor switch 106, and as soon as drive shaft 84 reaches the predetermined speed, switch 106 will close, completing the electrical circuit on through the pull-in coil 107.

The magnetic effect of coil 107 will draw the valve stem 111 downward, breaking the contact 110 and relieving the pull-in coil 107; and at the same time, current is still flowing through the hold-in coil 108 maintaining the valve pistons 62 and 63 in a downward position, compressing spring 98 and opening port 94 to vent the regulated pressure from clutch control valve 88 and dumping it through line 95 to sump S. Also the bottom piston 63 will clear the entrance of the pressure from main pressure line 93 and dump it through line 96 to sump S.

Venting line 93 and dumping it through line 96, FIG. 5, cuts off pressure entering clutch control valve 88 and the springs 89 in clutch 47, FIG. 4, forces piston 88a to release pressure from clutch plates 90 and 90a and disengages the power from the turbine 5, preventing the driving force from entering the transmission while the vehicle is stopped. This action relieves the engine effort while the vehicle is standing with the brake being held and also relieves the driving force on the turbine member and eliminates the tendency of vehicle creep.

If the traffic light changes to green, the operator will release the pressure on the foot brake, pressure in line 100 will drop off and pressure switch 104 will be opened, breaking the circuit between the source of electrical energy of the battery 101 and removing power from hold-in coil 108. Spring 98 will force the pistons 62 and 63 and valve stem 111 back upward, closing all the input and discharge ports of valve 87 and blocking the relief of pressure in line 93, returning it to the clutch valve 88 and returning the regulated pressure in line 94 back into the clutch valve 88 t assist spring 99 in realigning valve piston 113 to the proper place to return proper pressure delivery to line 97 and into the clutch 47 to force piston 88a to the right and compress the clutch plates 90 and 90a and restore power from the turbine 5 to drive the vehicle. An ignition switch 102, when closed, helps complete the electrical circuit, FIG. 6. A fuse 103 protects overloading of the circuit 105. The circuit has a negative ground 109 as shown in the drawing, FIG. 6.

The CW movement of housing 37 drives coaxial drive collar 70 that engages clutch roller 76 and drives the outer clutch race 75 in a CW direction to change the ratio of the transmission by forcing the ring gear 51 and 57 to be moved CW also. The faster the ring gears 51 and 57 are moved CW, the closer to direct-drive the transmission becomes.

IN OPERATION

From a Park Position: The prime mover or engine "E" transfers hydro-kinetic force from the impeller vanes 7 to the turbine vanes 5 and also delivers mechanical torque simultaneously through input shaft 14 to drive sun gears 40 and 23, FIG. 1. Shaft 14 is splined to the converter housing 9 by splines 11 and 12. The engine is started with manual control valve 86, FIG. 5, having its valve stem 64 and pistons 65 and 66 at the bottom of the valve cylinder, arrow 86, with pump pressure bypassing through valley 117 to sump S with no pressure being delivered to clutch valve 88 through line 93.

To place the transmission in operation, the ignition switch 102 is turned on and the manual control valve 86, FIG. 5, is moved to driving position as shown in FIG. 5. The pump 2 delivers fluid under pressure through pressure line 93 that passes through the valley 117 in valve 86, FIG. 5, and enters the clutch control valve 88 through line 93. Control pressure enters valve 88 through line 94 to assist spring 99 that has been previously tensioned to the proper pressure and the spring 99 and control pressure in line 94 moves the piston 113 right to open the port from input line 93 and admit pressure. Pump pressure, line 93, passes around the bypass partition 114 to the front end of piston 113 and the discharge line 112 is partially closed off by piston 113 until the proper amount of operating pressure is attained and discharged out line 97 that leads to clutch 47. If the engine and pump 2 run too fast and deliver a greater volume of fluid than is necessary, pressure builds up on the right end of piston 113, forcing it to the left, compressing spring 99 and dumping the excess fluid through line 112 to sump S.

Rotation of the sun gears 49 and 56, FIG. 1a, delivers driving force to carrier 59 and extends it into unit 3a, and unit 3, where the force is applied to carrier 36 to drive planet pinions 38 against the ring gear 34 and sun gear 40 and the combination of the forces of the planet pinions 38 and the sun gear 40 causes ring gear 34 and housing 37 to be driven CW or actually dragged forward in a CW rotational direction.

If the pump 2 is running too slow and not delivering sufficient fluid through line 93 to valve 86, spring 99 and the control pressure in line 94 will advance the piston 113 to the right in valve 88, opening the port of line 93 that delivers pressure to valve 88 and partially closing off line 112 to the sump S, admitting more fluid to bring the working pressure back to standard in line 97.

Pressure in line 97 leaving control valve 88 enters the input shaft 14 through the center passageway 97, FIG. 4, and applies pressure against piston 88a to engage the clutch 47 that extends the rotation from shaft 15 to shaft 48 and sun gear 49 of the first planetary gear set 42 to drive pinions 53 on their axles 52 against ring gear 51. This operation causes reacting force from pinions 53 to apply force to ring gear 51 in a CCW direction, and extends its CCW force through drive shell 67 and flange 120 to the outer clutch race 75. The output rotation of carrier 54 developed by planet pinions 53 driving against ring gear 51 drives a second sun gear 56 by driving collar 55 of unit 43, FIG. 1a, and sun gear 56 further drives planet pinions 58a against ring gear 57, that is also extended rearward by drive shell 67 and flange 120 to the outer clutch race 75 that controls the action of drive shell 67 and ring gears 51 and 57.

At initial start-up, clutch roller 77 holds outer clutch race 75 engaged to case 17 and the ring gears 51 and 57 provide a positive reaction point for planet pinions 53 and 58a to drive against and produce torque because the sun gears 49 and 56 are able to rotate their maximum amount in driving the planet pinions 53 and 58a while ring gears 51 and 57 are held stationary temporarily at low input speed by clutch roller 77. Movement required to advance the drive shaft 26 also produces CW rotation to the ring gear support carrier 37 and concentric drive collar 70 which cause planet pinions 20 and ring gear 19 to move CW to some extent; and when carrier 37 moves CW, the concentric drive collar extension 70 rotates in the same CW direction and engages the one-way clutch roller 76 and drives the outer clutch race 75 CW also and the one-way clutch roller 77 releases its engagement to case 17, permitting clutch roller 76 to control the direction and speed of the outer clutch race 75 and ring gears 57 and 51 by engagement of the drive shell 67 with the ring gears.

The main and most important object of the mechanical modulator unit 45 is to be able to vary the ratio of the transmission without an gear changes all the way from a standing mode to a direct-drive; and the reaction torque mechanical modulator unit 45 accomplishes this by forcing the drive shell 67 CW and moving the ring gears 51 and 57 forward in a CW direction as the speed of the output shafts 26 and 84 starts increasing. As the vehicle speed increases, the speed of the ring gear carrier support housing 37 increases speed CW also and the concentric drive extension 70 that is engaged to the ring gear support carrier 37 engages the outer clutch race 75 by means of one-way clutch roller 76 and pulls the outer clutch race 75 along at the same speed until it reaches the saturation point of direct-drive ratio.

If the vehicle is cruising along in direct-drive and everything rotating as a single unit and a steep grade is encountered, the ratio inside the transmission will change to provide relief for the prime mover. A steep grade will increase the work load on the main output shaft 84 of the overdrive unit shown by arrow 46, FIG. 2a and FIG. 3.

The extra work load will slow shaft 84 and 26 because the vehicle is engaged to the drive shaft. The mechanical gear train is unable to provide any relief from the work load because of its toothed gear engagement, and the engine needs to maintain its torque-producing speed; but something has to change to maintain the optimum engine speed. What happens is that when shaft 26, FIG. 1 and FIG. 3 slows down, its carrier 22 and planet axles 21 are forced to slow also; and with sun gear 23 that is being driven mechanically at input engine speed by shaft 14, still moving at that same speed, the slowing of the planet axles 21 forces the planet pinions 20 to start rotating on their axles 21 and sun gear 23 drives them CCW on their axles and they force ring gear 19 to also slow down and further slow ring gear 34. This slowing process extends on through the other planetary units until the torque and speed change is applied against the turbine 5. Since the turbine 5 is of a hydro-kinetic nature, it is able to slow down when overburdened by the additional work load by dissipating part of the input rotation and nothing will break, whereas the mechanical gear train is unable to give any relief because of its positive gear and shaft engagement between the prime mover and the work load.

This slowing process also permits the outer clutch race 75, drive shell 67, and ring gears 51 and 57 to slow; and when ring gears 51 and 57 slow down, torque multiplication starts up in the gearing within the units 42, 43, 3 and 3a, providing more leverage for the turbine 5 to drive sun gear 49 and permits the turbine to move faster and closer to the RPM of the impeller than it normally would without the assistance of the planetary units 42 and 43. As the driving force increases, the speed of the vehicle will start changing back up toward direct-drive when the load lightens sufficiently.

I claim:

1. In a transmission, having a continuously enmeshed gear train mechanically connecting an engine crankshaft to an output drive shaft of a vehicle and which includes, a torque converter including a housing and a fluid reaction turbine means rotatably mounted within the housing, an input drive shaft having first and second ends, an output drive shaft having first and second ends, the first end being connected to the housing so that the input drive shaft is rotatable therewith, a planetary transmission gear means drivingly mounted adjacent the second end of the input drive shaft, a torque/speed modulating gear means drivingly mounted adjacent the first planetary transmission gear means and spaced inwardly thereof relative to the second end of the input drive shaft, a ring gear support housing surrounding the first planetary transmission gear means and the torque/speed modulating gear means and being rotatable with respect to the input drive shaft, two spaced annular ring gears fixedly carried by the ring gear support housing, the first planetary transmission gear means including a first sun gear mounted to the input drive shaft and first orbiting planet pinions which are mounted to a first carrier so as to be intermeshed with one of the ring gears, the first carrier being drivingly connected to the first end of the output drive shaft, the torque/speed modulating gear means including a second sun gear mounted to the input drive shaft and second orbiting planet pinions carried by a second carrier so as to be engageable between the second sun gear and a second of the ring gears, a turbine drive shaft extending in concentric relationship with said input drive shaft, and the turbine drive shaft being drivingly connected to the fluid reaction turbine means, the improvement comprising: the turbine drive shaft including first and second sections, a clutch means between said first and second sections, said first section being in driving engagement with the fluid turbine means and said clutch means, said second section having first and second ends, said first end of said second section being drivingly engaged with said clutch means and said second nd thereof drivingly engaged to a primary sun gear of a primary planetary variable torque-increasing gear means, a rotatable drive shell surrounding said primary planetary variable torque-increasing gear means, and drive shell including a first ring gear, said primary planetary torque-increasing gear means including primary orbiting planet pinions which are mounted to a primary carrier so as to be intermeshed with said first ring gear of said drive shell, and means for drivingly connecting said primary carrier to the second carrier of the torque/speed modulating gear means.

2. The transmission of claim 1 in which said means for drivingly connecting said primary carrier to the second carrier of the torque/speed modulating gear means includes a first collar concentric with and surrounding said second section of said input drive shaft.

3. The transmission of claim 1 in which the means for drivingly connecting said primary carrier to the second carrier of the torque/speed modulating gear means includes a first concentric drive collar surrounding said second section of said input drive shaft, said primary carrier being drivingly engaged to said first collar, a secondary sun gear drivingly engaged to said first collar, secondary planet pinions mounted to a secondary planet carrier, said drive shell having a secondary ring gear, said secondary planet pinions being intermeshed with said secondary ring gear, said secondary planet carrier being connected to a secondary concentric drive collar, and said secondary drive collar being engaged with the second carrier of the torque/speed modulating gear means.

4. The transmission of claim 1 in which said drive shell includes first and second ends and surrounds said ring gear support housing, said first end of said drive shell supported by a rotatable flange journaled about said second section of the turbine drive shaft, and said second end of said drive shell engaged to an outer rotatable clutch member of a ring gear modulator surrounding said output drive shaft, whereby the rotational direction and speed of said drive shell is regulated by said ring gear modulator.

5. The transmission of claim 4 in which said mechanical ring gear modulator includes first, second, and third on-way roller clutch means, clutch cams fitted to said output drive shaft for receiving driving torque from said first carrier of said first planetary transmission gear means, said clutch cams aligned to engage said second one-way roller clutch means to said rotatable outer clutch member of said mechanical ring gear modulator, a first concentric output collar having first and second ends, said first end of said first output collar being in driving engagement with the said ring gear support housing and in surrounding relationship to said output drive shaft and said second end fitted with clutch cams that are aligned to engage said first one-way roller clutch means, a second concentric output collar having first and second ends, said first end of said second output collar being fitted with clutch cams to engage said third one-way clutch roller means and said second end thereof in fixed engagement to a transmission case, said transmission case enclosing said mechanical ring gear modulator and said drive shell.

6. The transmission of claim 1 including a transmission case enclosing said drive shell, said second end of said output drive shaft being drivingly engaged to a planet carrier of an overdrive planetary gear set to drive said overdrive planet carrier in the same direction as said output drive shaft, said planetary overdrive gear set including a concentric fixed collar having first and second ends, said first end of said fixed collar engaged to said transmission case to prevent rotation of said fixed collar in either direction, said second end of said fixed collar engaging an overdrive sun gear to prevent rotation thereof, an overdrive planet carrier engaged to and driven by said output drive shaft, overdrive planet pinions mounted to said overdrive planet carrier and rotatable therewith, an overdrive ring gear surrounding and meshed with said overdrive planet pinions, said overdrive planet pinions meshing with said overdrive sun gear, and a final drive shaft in driving engagement with said overdrive ring gear and driven by said overdrive ring gear to convey overdrive rotation to said final drive shaft.

7. The transmission of claim 1, in which said clutch means includes a drum engaged to said first section of the turbine drive shaft and a clutch hub in driving engagement with said second section of the turbine drive shaft, actuating and engagement means to mechanically lock said first section to said second section of said turbine drive shaft to deliver rotational force to said primary sun gear to deliver hydro-kinetic force to drive said primary sun gear when said clutch engagement means are activated.

8. The transmission of claim 7 including hydraulic control means for controlling said actuating and engagement means, said hydraulic control means including means for delivering fluid under pressure, pressure lines to conduct the fluid to control a plurality of control valves, discharge lines for relieving pressure from said control valves, a sump, said control valves including an electrically operated brake valve and a clutch control valve to actuate said actuating and engagement means to deliver hydro-kinetic torque to the transmission when engaged and to eliminate hydro-kinetic force from the turbine means for entering the transmission when said clutch means is disengaged, said control valves further including a manual control valve to deliver fluid under pressure through said pressure lines when said discharge lines are blocked and to relieve pressure form the pressure lines when the discharge line is unblocked, and said brake valve relieving pressure from said clutch actuating and engagement means when actuated by pressure in said pressure lines when barking and directing pressure to said clutch control valve when braking is discontinued.

9. The transmission of claim 8 in which said brake valve includes a valve stem, electrical control means for shifting said valve stem to control the flow of fluid through said brake valve, and sensor means for monitoring the speed of said output drive shaft electrically connected to said electrical control means.

* * * * *

UNITED STATES PATENT AND TRADEMARK OFFICE
CERTIFICATE OF CORRECTION

PATENT NO. : 5,279,527

DATED : January 18, 1994

INVENTOR(S) : Samuel J. Crockett

It is certified that error appears in the above-indentified patent and that said Letters Patent is hereby corrected as shown below:

In the Drawings, Figure 3, replace reference number "118" with --77--; and replace "77" with --118--.

Signed and Sealed this

Ninth Day of August, 1994

Attest:

BRUCE LEHMAN

Attesting Officer

Commissioner of Patents and Trademarks